United States Patent [19]
Ito et al.

[11] 4,249,198
[45] Feb. 3, 1981

[54] PHASE LOCKING SYSTEM FOR TELEVISION SIGNALS

[75] Inventors: Yutaka Ito; Masao Inaba; Mineo Mizukami; Mikio Shimizu, all of Tokyo, Japan

[73] Assignees: Nippon Electric Co., Ltd.; Tokyo Broadcasting System Inc., both of Tokyo, Japan

[21] Appl. No.: 18,475

[22] Filed: Mar. 8, 1979

[30] Foreign Application Priority Data

Mar. 8, 1978 [JP] Japan ............................. 53-26855

[51] Int. Cl.³ .................... H04N 9/46; H04N 5/76
[52] U.S. Cl. .................................. 358/13; 358/8; 358/19
[58] Field of Search .................. 358/8, 13, 19; 360/9, 360/32, 33, 36

[56] References Cited
U.S. PATENT DOCUMENTS 3,909,839 9/1975 Inaba ...................................... 358/8
4,007,486 2/1978 Inaba ...................................... 358/8

Primary Examiner—Robert L. Griffin
Assistant Examiner—Michael A. Masinick
Attorney, Agent, or Firm—Hopgood, Calimafde, Kalil, Blaustein & Lieberman

[57] ABSTRACT

An improved phase locking system in which an independently reproduced video signal is coded into a digitized video signal in response to a first clock pulse train, the first clock pulse train being produced from a synchronizing signal and/or a color burst signal contained in the video signal. The digitized video signal is stored and storage location as well as delay prior to storage is controlled in response to the phase difference between the synchronizing signal and a reference signal. The improved phase locking system reduces the frequency of occurence of visual shifts on the reproduced television picture.

6 Claims, 6 Drawing Figures

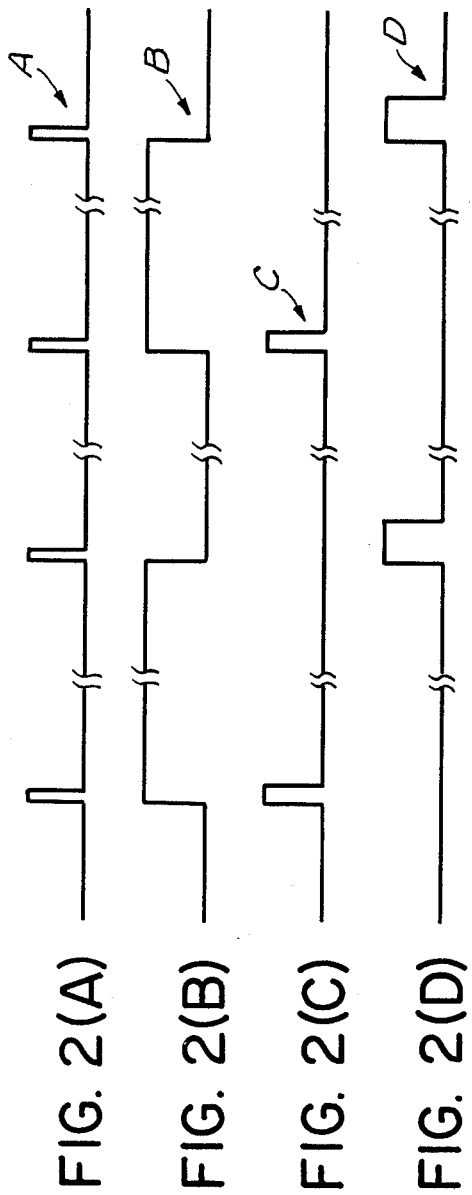
FIG. 2(A)
FIG. 2(B)
FIG. 2(C)
FIG. 2(D)
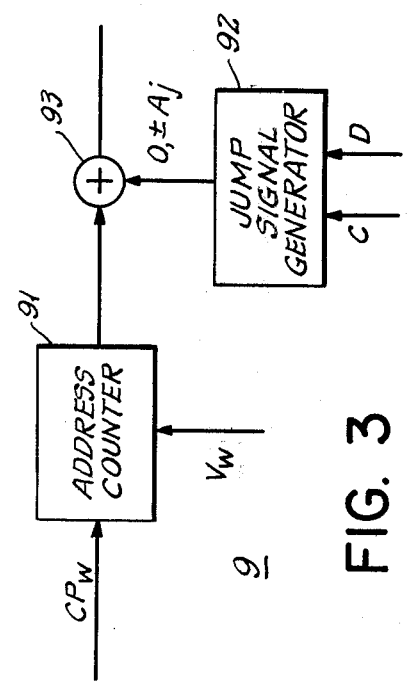
FIG. 3

PHASE LOCKING SYSTEM FOR TELEVISION SIGNALS

FIELD OF THE INVENTION

This invention relates to a phase locking system for television signals, and more particularly to a phase locking system capable of phase locking a color television signal differing in phase and frequency from a reference signal.

BACKGROUND OF THE INVENTION

Conventional digital phase locking systems such as frame synchronizers and time-base correctors are described in U.S. Pat. Nos. 3,909,839 entitled "PHASE LOCKING SYSTEM FOR TELEVISION SIGNALS USING DIGITAL MEMORY TECHNIQUES" and 4,007,486 entitled "PHASE LOCKING SYSTEM FOR TELEVISION SIGNALS USING A DIGITAL MEMORY TECHNIQUE". In such conventional digital phase locking systems, an input television video signal is coded and then stored in digital memory means in response to a first clock pulse train synchronized with the input television video signal. The stored signal is read out in response to a second clock pulse train synchronized with a reference signal.

In television systems such as the NTSC, PAL and SECAM systems used in present television broadcasting, an interlaced scanning system is adopted. In the NTSC system, for example, 30 pictures are transmitted per second, and a frame representing one picture consists of two, odd-and even-numbered fields, differing by one half of one horizontal scanning line with respect to the scanning position. Further, the color-subcarrier phase, in two adjacent frames, is opposite to each other. Assume, that the digital memory capacity, utilized in prior art systems, corresponds to one field. Then, if the memory content is read out duplicatively, i.e., read out before it has been replaced by new data of a following field (duplicative read-out), or vice versa (duplicative write-in), the result is a phase-shaft on the read-out signal wherein the vertical synchronizing signal is phase-shifted by one half ($\frac{1}{2}$H) of one horizontal scanning period (1H). In addition, in the case where memory capacity corresponds to one frame, the duplicative read-out or duplicative write-in will give rise to another phase-shift wherein the horizontal synchronizing signal is phase-shifted by one half (about 140 nanoseconds) of one cycle period of the color subcarrier. These phase-shifts in the read-out signal result in visual effects on the reproduced picture in that reproduced scanning lines are visable in the vertical or horizontal direction.

The rate of occurrence of such undesired duplicative read-out or write-in is proportional to the frequency difference between the synchronizing signals contained in the input and the reference signals, and inversely proportional to the memory capacity when the input signal does not fluctuate in frequency. Assuming that the frequency difference with respect to the subcarrier frequency of 3.58 MHz is 10 Hz and the memory capacity is one field, the rate of occurrence is approximately once every 1.66 hours. Such an occurrence is negligible as a practical matter.

Conversely, a reproduced signal from a video tape recorder (VTR) contains frequency fluctuations, i.e., a time-base error. To compensate for the time-base error, a time base corrector (TBC) has been employed, which has a compensating range of several horizontal scanning periods. When utilizing a TBC the VTR is driven by the reference signal supplied from the TBC so that the phase of the VTR-reproduced signal is within a predetermined phase-range with respect to the phase of the reference signal.

In the case where a reference signal can not be supplied to the VTR, the VTR reproduces a video signal independent of the reference signal. The independently reproduced video signal is supplied directly to a frame synchronizer. The frame synchronizer comprises a clock pulse generator for producing a write-in clock pulse train following the time-base fluctuation and memory means having a capacity of at least one field, to compensate for the time-base error and to phase-lock the reproduced signal to the reference signal. However, the VTR-reproduced signal contains the time-base error. When the phase of the reproduced signal approaches that of the reference signal, duplicative read-out and duplicative write-in become frequent making frequent visual shifts in the reproduced picture on the picture tube.

It is, therefore, an object of this invention to provide an improved phase locking system capable of phase-locking an independently reproduced video signal from the VTR to the reference signal without causing visual shifts in the reproduced picture on the picture tube.

SUMMARY OF THE INVENTION

According to the invention, there is provided an improved phase locking system in which an independently reproduced video signal is coded into a digitized video signal in response to a first clock pulse train, the first clock pulse train being produced from the synchronizing signal and/or the color burst signal contained in the independently reproduced video signal. The digitized signal is supplied through first delay means, or directly, to memory means having a memory capacity of at least one field of the digitized signal. Writing the digitized signal into the first memory means is controlled by a write-in address signal, the write-in address signal being produced from the first clock pulse train, and the synchronizing signal, by a write-in address signal generator. The synchronizing signal is supplied through second delay means, identical to the first delay means in delay time, or directly, to the write-in address signal generator in response to whether the digitized signal is passed through the first delay means. A selection between direct passage, or of the digitized signal and the synchronizing signal through the delay means, is controlled in response to a phase difference between the synchronizing signals contained in the independently reproduced signal and the reference signal. The digitized signal stored in the memory means is read out in response to a read-out address signal, which is produced from the reference signal.

The features and advantages of this invention will be understood from the following detailed description of a preferred embodiment of this invention taken in conjunction with the accompanying drawings.

BRIEF DESCRIPTION OF THE DRAWINGS

FIGS. 2(A) to 2(D) are waveform diagrams of signals appearing at various parts of the embodiment shown in FIG. 1; and FIG. 3 is a block diagram of the write-in address signal generator used in the embodiment shown in FIG. 1.

DETAILED DESCRIPTION

Figure 1:
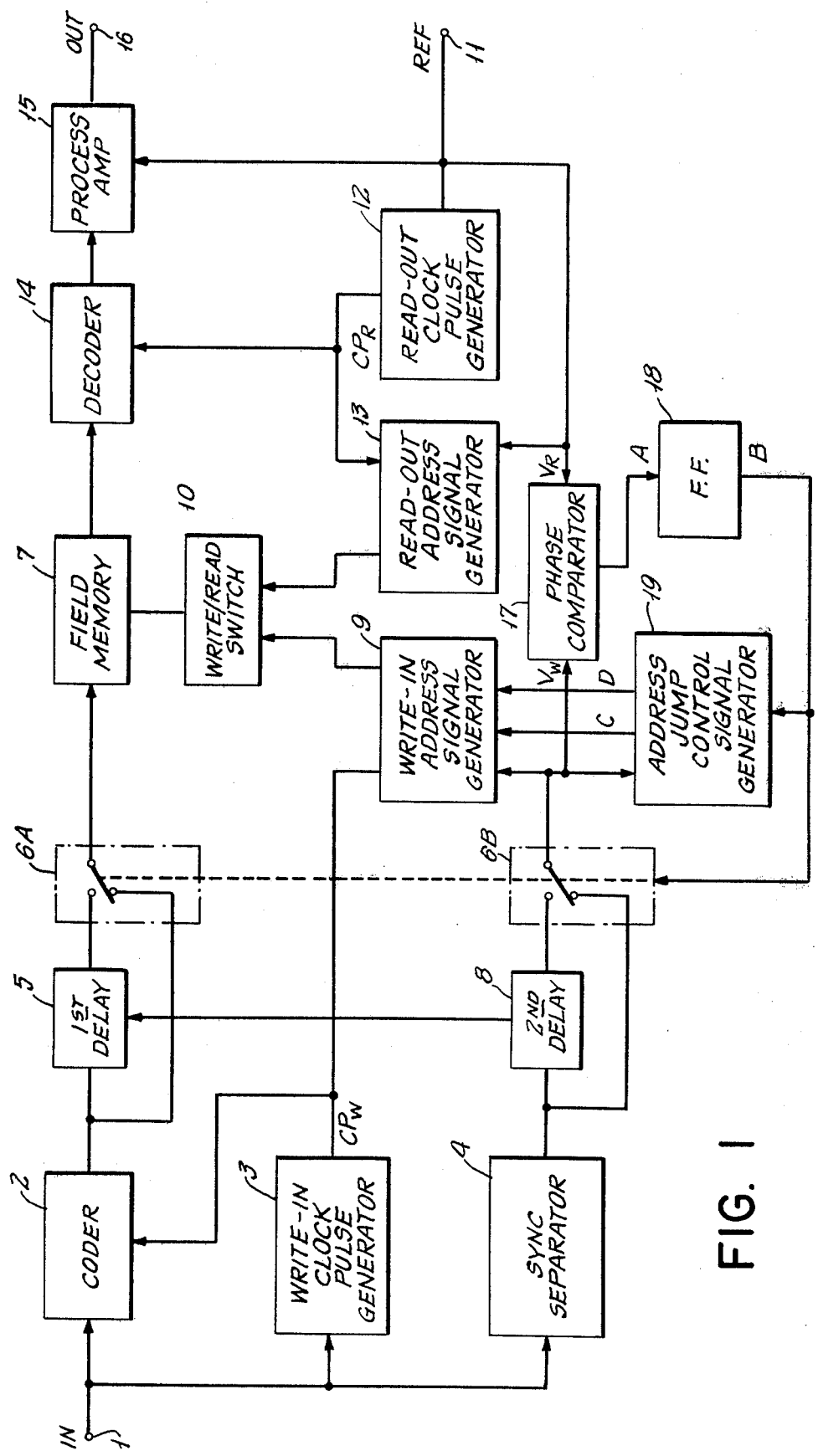
FIG. 1 is a block diagram of one embodiment of this invention.

Referring to FIG. 1, an embodiment of the invention is supplied at input terminal 1 with an input television video signal, the input video signal being reproduced independently of a reference signal from a VTR disposed at a station or at a field pick-up van. From terminal 1, the independently reproduced video signal is supplied to coder 2, a write-in clock pulse generator 3 and a sync separator 4. The clock pulse generator 3 produces a write-in clock pulse train CPw of approximately 10.74 MHz (3.58 MHz×3) which is synchronized with a synchronizing signal supplied from the sync separator 4 and/or a color burst signal contained in the video signal. The clock pulse train CPw is supplied to coder 2, which encodes the input video signal into a time serial 8-bit digital video signal having a clock frequency of 10.74 MHz. The digital video signal is supplied through a first delay means 5, or directly, to a switch 6A, and then stored in memory means 7 having a capacity of one field. The first delay means 5 may be comprised of an 8-bit parallel 3072-stage (1024×3) shift register which is supplied with the clock pulse train CPw as a shift pulse. Because the number of pulses in the clock pulse train CPw, in one horizontal scanning period (1H), is 682.5 (=455/2×3), the delay time of the first delay means 5 is approximately 4.5 H.

The synchronizing signal, from the sync separator 4, is supplied through a second delay means 8, or directly, to a switch 6B. The second delay means 8 may be comprised of a 3072-stage shift register which is driven by the clock pulse train CPw. The delay time of the second delay means 8 is identical to that of the first delay means 5, i.e., approximately 4.5 H.

The synchronizing signal from switch 6B is supplied to a write-in address signal generator 9. Generator 9 is also supplied with the clock pulse train CPw and produces a write-in address signal. The write-in address signal generator 9 is connected, via a write/read switch 10, to memory means 7 so that the time-parallel digits of the digitized video signal may be stored in memory means 7. The write/read switch 10 controls the supply of address signals for write-in and read-out of memory means 7.

The reference signal, incoming at REF terminal 11, is supplied to a read-out clock pulse generator 12 for generating a read-out clock pulse train $CP_R$ of 10.74 MHz synchronized with the reference signal. The clock pulse train $CP_R$ is supplied to a read-out address signal generator 13, which is supplied with the synchronizing signal contained in the reference signal. The read-out address signal generator 13 generates a read-out address signal, which is supplied through the write/read switch 10 to the memory means 7, causing data stored at the address designated by the read-out address signal to appear at the output of memory means 7.

The read-out 8-bit digitized signal from the memory means 7 is supplied to a decoder 14 in which the digitized video signal is converted into an analogue video signal in response to the clock pulse train $CP_R$. The analogue video signal is supplied to a processing amplifier 15, which is also supplied with the reference signal. In the processing amplifier 15, a correct synchronizing signal is added. Thus, the processing amplifier 15 provides, on output terminal 16, a composite video signal synchronized with the reference signal.

The detailed structure and operation of the embodiment described above is shown in the above-mentioned U.S. Patents.

The instant invention further comprises a phase comparator 17 for phase-comparing the synchronizing signal, from the switch 6B, with the reference synchronizing signal. Phase comparator 17 produces a detection pulse A, as shown in FIG. 2(A), when the phase difference between the vertical synchronizing signal Vw, from the switch 6B, and the reference vertical synchronizing signal $V_R$, becomes less than a predetermined value, for example, 100 microseconds (about 1.57 H). The detection signal A is supplied to a flip-flop circuit 18 for producing a switching signal B as shown in FIG. 2(B). Switching signal B is supplied to switches 6A and 6B to control the switching operation thereof. More particularly when switching signal B is at a logic "0" state, the switches 6A and 6B are in the position shown in FIG. 1, i.e., the direct passages are selected. Alternatively when signal B is at a logic "1" state, the switches 6A and 6B are in the opposite position, i.e., the passages through delay means 5 and 8 are selected.

Switching signal B is also supplied to an address jump control signal generator 19 for producing jump control signals C and D as shown in FIGS. 2(C) and 2(D), respectively. Generator 19 produces jump control signal C when the switching signal B is changed from a logic "0" state to a logic "1" state, and generator 19 produces jump control signal D when signal B is changed from a logic "1" state to a logic "0" state. Jump control signals C and D are supplied to the write-in address signal generator 9 to jump the write-in address signal by a predetermined value Aj. More particularly, when the jump control signal C is supplied, the write-in address signal is jumped to reduce its value by the value Aj corresponding to the delay time of the delay means 5 and 8. When the jump control signal D is supplied, the write-in address signal is jumped to increase its value by the value Aj. The value Aj is determined so that it is equal to the number of stages of the shift registers constituting delay means 5 and 8. Jump control signals C and D are reset by the vertical synchronizing signal from switch 6B.

Referring to FIG. 3, the write-in address signal generator 9 comprises an address counter 91 for producing the write-in address signal in response to receipt of clock pulse train CPw and synchronizing signal Vw from switch 6B, as the clock pulse and the clear pulse, respectively, jump signal generator 92, for producing a jump signal in response to jump control signals C and D, and an adder 93 for adding the jump signal to the write-in address signal. When neither jump control signal C nor D is supplied from address jump control signal generator 19, no jump signal is generated. In this instance the write-in address signal from the address counter 91 is transferred to memory means 7 unchanged. Jump signal generator 92 generates jump signals +Aj and −Aj in response to the jump control signals C and D, respectively. Jump signal +Aj or −Aj is added to the write-in address signal from address counter 91 by adder 93 to produce the jumped write-in address signal, which is then supplied to memory means 7.

In a phase locking system in accordance with the instant invention, when the phase difference between the synchronizing signal of the input signal, and the reference signal, approaches the predetermined value, the input signal to be stored in the memory means is delayed or advanced in order to increase the phase difference. In this manner it is possible to reduce the frequency of occurrence of visual shifts in the reproduced picture.

Although a specific embodiment of this invention has been shown and described it will be understood that various modifications may be made without departing from the spirit of this invention.

What is claimed is:

1. A phase locking system for a composite video signal having first synchronizing signals including horizontal and vertical synchronizing signals and a color subcarrier, said composite video signal having successive frames, each frame including two fields obtained by interlaced scanning, said frame being defined by said horizontal and vertical synchronizing signals, said first synchronizing signals having predetermined first phase relationships therebetween, said first phase relationships differing from one field to another for at least every two adjacent fields, said phase locking system comprising, means for producing a first clock pulse train having a predetermined phase relationship with said first synchronizing signals, means for encoding, in timed relationship with said first clock pulse train, said composite video signal into a digitized video signal, memory means for storing said digitized video signal in response to said first clock pulse train, said memory means having a capacity for storing at least one-field portion of said digitized video signal, means disposed between said encoding means and said memory means for delaying said digitized video signal for a predetermined period of time to produce a delayed digitized video signal, means for selectively supplying said digitized video signal or said delayed digitized video signal to said memory means, a reference signal source, having second synchronizing signals including reference horizontal and vertical synchronizing signals and a reference color subcarrier, said second synchronizing signals normally being out of synchronism with said first synchronizing signals, means for producing a second clock pulse train having a preset phase relationship with said second synchronizing signals, means for reading out, in timed relationship with said second clock pulse train, the stored digitized video signal from said memory means, and means for phase-comparing said first synchronizing signal with said reference synchronizing signal, said selectively supplying means being controlled by said phase-comparing means.

2. A phase locking system as claimed in claim 1 further comprising, means responsive to said first clock pulse train and said first synchronizing signals for producing a write-in address signal, the storage of said digitized video signal in said memory means being controlled by said write-in address signal, means for delaying said first synchronizing signal for said predetermined period to produce a delayed synchronizing signal, means for supplying said first synchronizing signal to said write-in address signal producing means as a non-delayed synchronizing signal, and means for selectively supplying said delayed and non-delayed synchronizing signals to said write-in address signal producing means, the selection of said delayed and non-delayed synchronizing signals being controlled by said phase-comparing means.

3. A phase locking system as claimed in claim 2, wherein said write-in address signal producing means comprises means responsive to said phase-comparing means for jumping said write-in address signal.

4. A phase locking system for a composite video signal, said composite video signal having first synchronizing signals including horizontal and vertical synchronizing signals, said phase locking system comprising, means responsive to a first clock pulse train for encoding said composite video signal into a digitized video signal, said first clock pulse train having a predetermined phase relationship with said first synchronizing signals, memory means responsive to said first clock pulse train for storing said digitized video signal, means disposed between said encoding means and said memory means for delaying said digitized video signal for a predetermined period of time, means for selectively supplying the digitized video signal or the output of said delaying means to said memory means, a reference signal source having second synchronizing signals including reference horizontal and vertical synchronizing signals, means responsive to a second clock pulse train for reading out said stored digitized video signal from said memory means, said second clock pulse train having a preset phase relationship with said second synchronizing signals, and means for comparing the phase difference between said first synchronizing signal and said reference synchronizing signal and for controlling operation of said selectively supplying means.

5. A phase locking system in accordance with claim 4 further including bistable means, responsive to said phase difference being less than a predetermined value, for changing between first and second stable states.

6. A phase locking system in accordance with claim 5 further including means responsive to said first clock pulse train for producing a write-in address signal, said write-in address signal for controlling storage of said digitized video signal in said memory means, and means responsive to state changes of said bistable means for altering said write-in address signal.

* * * * *